United States Patent [19]

Funabashi et al.

[11] Patent Number: 5,019,962
[45] Date of Patent: May 28, 1991

[54] DIRECT MEMORY ACCESS CONTROLLER FOR A MULTI-MICROCOMPUTER SYSTEM

[75] Inventors: Tsuneo Funabashi, Tokyo; Kaoru Sakoshita, Kodaira, both of Japan; Hiroshi Yonezawa, Cupertino, Calif.

[73] Assignee: Hitachi, Ltd., Tokyo, Japan

[21] Appl. No.: 144,523

[22] Filed: Jan. 15, 1988

[30] Foreign Application Priority Data

Jan. 16, 1987 [JP] Japan ................... 62-5977

[51] Int. Cl.⁵ .............. G06F 15/16; G06F 13/28; G06F 13/38
[52] U.S. Cl. ............................ 364/200; 364/228; 364/229; 364/242.3; 364/238.3; 364/238.4; 364/242.31
[58] Field of Search ... 364/200 MS File, 900 MS File; 370/85; 340/825.5

[56] References Cited

U.S. PATENT DOCUMENTS

| | | | |
|---|---|---|---|
| 4,219,873 | 8/1980 | Kober et al. | 364/200 |
| 4,296,466 | 10/1981 | Guyer et al. | 364/200 |
| 4,412,285 | 10/1983 | Neches et al. | 364/200 |
| 4,428,044 | 1/1984 | Liron | 364/200 |
| 4,438,488 | 3/1984 | Shibayama et al. | 364/200 |
| 4,479,179 | 10/1984 | Dinwiddie, Jr. | 364/200 |
| 4,485,438 | 11/1984 | Myrmo et al. | 364/200 |
| 4,503,496 | 3/1985 | Holzner et al. | 364/200 |
| 4,543,627 | 9/1985 | Schwab | 364/200 |
| 4,577,273 | 3/1986 | Hopper et al. | 364/200 |
| 4,608,631 | 8/1986 | Stiffler et al. | 364/200 |
| 4,639,860 | 1/1987 | Peters | 364/200 |
| 4,692,862 | 9/1987 | Cousin et al. | 364/200 |
| 4,787,041 | 11/1988 | Yount | 364/424.03 |
| 4,807,116 | 2/1989 | Katzman et al. | 364/200 |
| 4,831,523 | 5/1989 | Lewis et al. | 364/200 |
| 4,866,664 | 9/1989 | Burkhardt et al. | 364/200 |

Primary Examiner—Michael R. Fleming
Assistant Examiner—Gopal C. Ray
Attorney, Agent, or Firm—Fay, Sharpe, Beall, Fagan, Minnich & McKee

[57] ABSTRACT

A multi-microcomputer system comprising a first microcomputer system, a second microcomputer system, and a direct memory access controller which has a function of controlling a data transfer operation that is executed between the first microcomputer system and the second microcomputer system.

6 Claims, 4 Drawing Sheets

1

DIRECT MEMORY ACCESS CONTROLLER FOR A MULTI-MICROCOMPUTER SYSTEM

BACKGROUND OF THE INVENTION

This invention relates to a direct memory access controller. More particularly, it relates to a technique which is effective when a direct memory access controller is utilized in a multi-microcomputer system.

A direct memory access controller transfers large amounts of data between a peripheral device such as floppy disk device and a RAM (random access memory) device or the like at high speed without the intervention of a microprocessor. Such direct memory access controllers are described in, for example, "HITACHI MICROCOMPUTER DATA BOOK 8/16-BIT MICROCOMPUTER PERIPHERAL LSI's" issued in September 1985 by Hitachi, Ltd., p. 168-p. 180 (for 8 bits) and p. 389 (for 16 bits).

In, for example, a multi-microcomputer system wherein an I/O subsystem (microcomputer system) such as graphic engine board is added to a main microcomputer system in order to enhance a system performance, it becomes necessary to transfer data between a RAM and a peripheral device across the two systems. The prior-art direct memory access controller as mentioned above, however, can only transfer data between a peripheral device and a RAM within a single microcomputer system. This has led to a problem. The data transfer between the RAM and the peripheral device cannot be carried out across the two systems.

SUMMARY OF THE INVENTION

An object of this invention is to provide a direct memory access controller which permits data to be transferred across systems within a multi-microcomputer system.

The above and other objects and novel features of this invention will become apparent from the description of the specification and the accompanying drawings.

A typical aspect of performance of this invention is briefly summarized as follows: A direct memory access controller is endowed with the function of forming control signals for data transfer between at least two buses in accordance with information bits which designate the bus layout and transfer mode of a system.

According to the explanation stated above, the data transfer between the buses in a multi-bidirectional bus drivers which are controlled by the data transfer control signals formed in accordance with the designation of the bus layout and the transfer mode.

DESCRIPTION OF THE PREFERRED EMBODIMENTS

Figure 1:
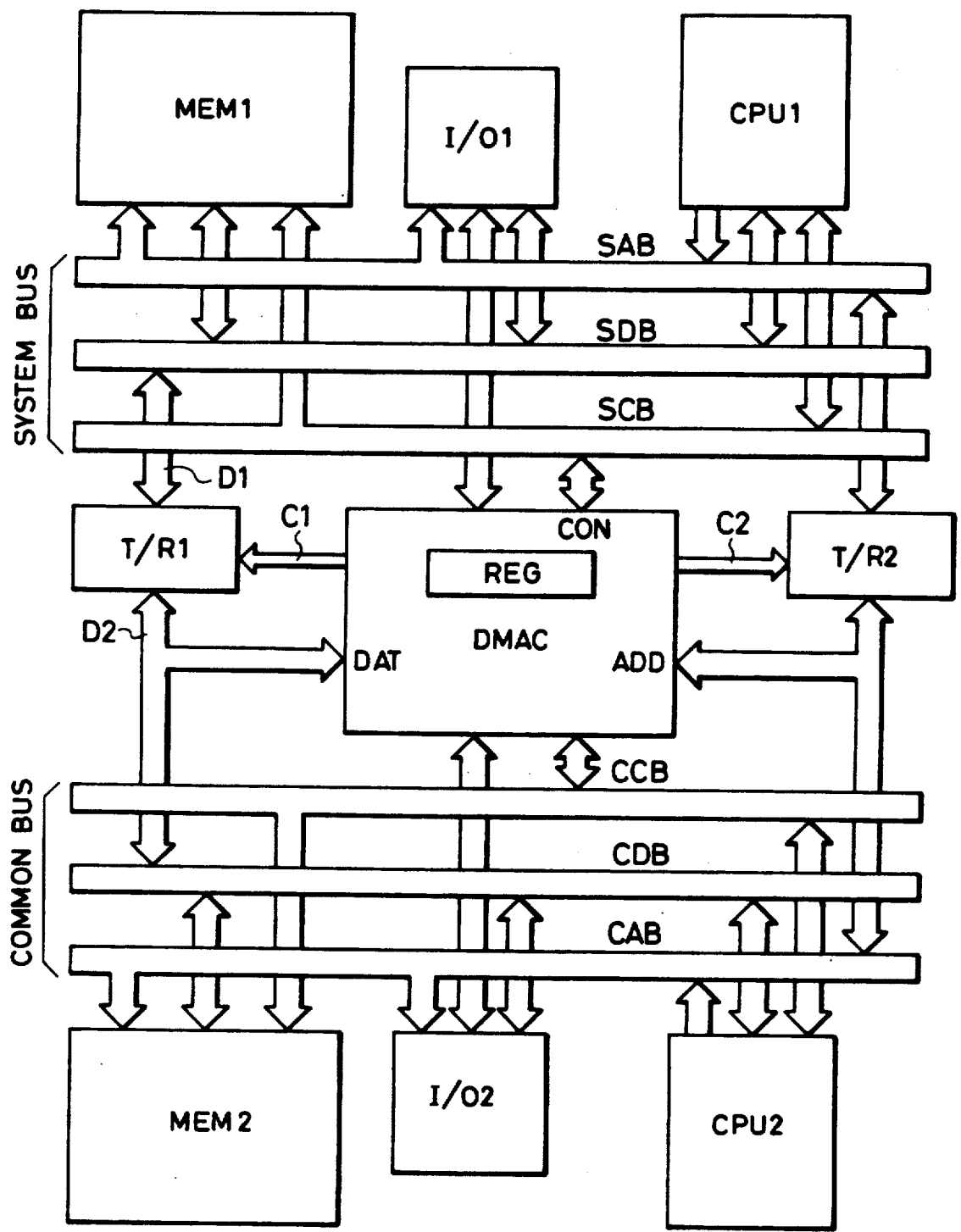
FIG. 1 is a block diagram showing an embodiment of a multi-microcomputer system which employs a direct memory access controller according to this invention.

Shown in FIG. 1 is a block diagram of an embodiment of a multi-microcomputer system which employs a direct memory access controller according to this invention. The multi-microcomputer system of this embodiment adopts a simplified 2-bus scheme wherein microcomputer systems on a system side and a common side are respectively constructed around two microprocessors, CPU1 and, CPU2. CPU1 and CPU2 lie in a superior/inferior relationship.

The microcomputer on the system side is constructed of the system microprocessor CPU1, a main memory unit MEM1 and an input/output unit I/01. These constituents are interconnected through an address bus SAB, a data bus SDB and a control bus SCB.

The microcomputer on the common side is constructed of the common microprocessor CPU2, a main memory unit MEM2 and an input/output unit I/02. These constituents are interconnected through an address bus CAB, a data bus CDB and a control bus CCB.

A direct memory access controller DMAC is furnished with the function of transferring data between the main memory unit MEM1 or MEM2 and input/output unit I/01 or I/02 of each of the microcomputer systems on the system side and the common side. VDMAC also has the function of transferring data across the two systems.

In the multi-microcomputer system in which the superior position (system side) and the inferior position (common side) are ranked as described above, the data terminal DAT and address terminal ADD of the direct memory access controller DMAC are respectively coupled to the data bus SDB and address bus SAB of the system side through bidirectional bus drivers (transmitters/ receivers) T/R1 and T/R2 for the purpose of giving priority to the operation of the microcomputer system of the system side. Similarly, the data bus CDB and address bus CAB of the common side of the inferior position are respectively coupled to the data terminal DAT and address terminal ADD of the direct memory access controller DMAC.

The direct memory access controller DMAC has input/ output terminals which are coupled with the input/output units I/01 and I/02 in both the microcomputer systems by control lines. The DMAC input/output terminals are also coupled to both the control buses SCB and CCB.

The direct memory access controller DMAC of this embodiment includes a register REG by which the controller has its operation mode designated in order to make it applicable to both the multi-microcomputer system as stated above and a single microcomputer system. In accordance with the system designated according to information bits stored in the register REG, a plurality of control signals for performing a data transfer operation among a plurality of sorts of data transfer modes are formed. On the basis of these control signals, control signals C1 and C2 for controlling the respective bidirectional bus drivers T/R1 and T/R2 are formed. Each of the control signals C1 and C2 is composed of an enable signal EN for an operation control, and a direction signal DIR for indicating a transfer direction.

Figure 3:
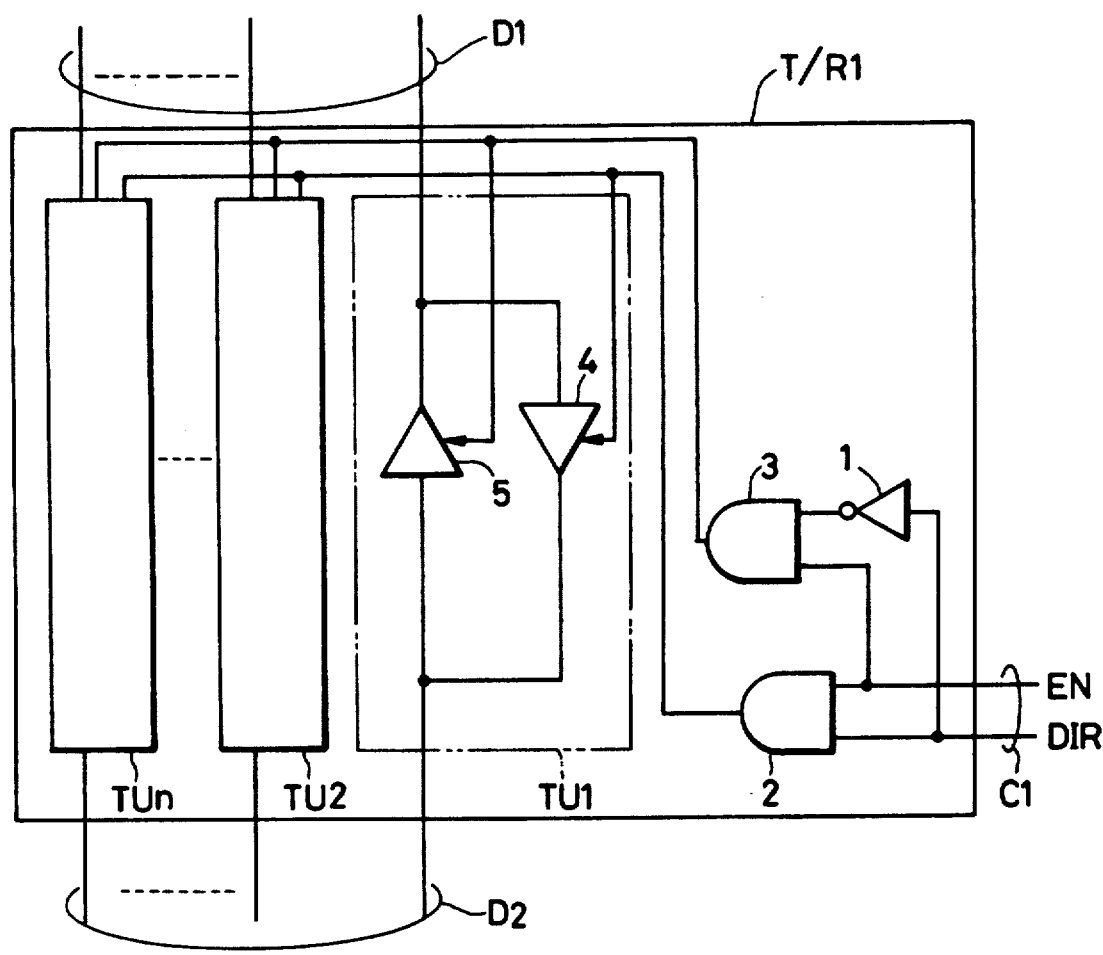
FIG. 3 is a circuit diagram of a bidirectional bus driver for use in the multi-microcomputer system to which this invention is applied.

FIG. 3 is a circuit diagram showing an example of the bidirectional bus driver T/R1. This bidirectional bus driver T/R1 includes a plurality of unit bidirectional switch circuits TU1, TU2, . . . , and TUn which are identical in arrangement. The control signal C1 from the direct memory access controller DMAC is composed of the enable signal EN and the direction signal DIR. The enable signal EN is supplied to one input terminal of each of 2-input AND circuits 2 and 3. The direction signal DIR is supplied to the other input terminal of the 2-input AND circuit 2 directly, and to the other input terminal of the 2-input AND circuit 3 through an inverter circuit 1. The output signal of the 2-input AND circuit 2 is supplied to a 3-state buffer circuit 4. The output signal of the 2-input AND circuit 3 is supplied to a 3-state buffer circuit 5. When the 3-state buffer circuit 4 is brought into an operating state by the output signal of the 2-input AND circuit 2, data on a data bus D1 coupled with the system data bus SDB is transferred to a data bus D2 coupled with the common data bus CDB. In addition, when the 3-state buffer circuit 5 is brought into an operating state by the output signal of the 2-input AND circuit 3, data on the data bus D1 coupled with the system data bus SDB is transferred to the data bus D2 coupled with the common data bus CDB.

When the 3-state buffer circuits 4 and 5 are brought into non-operating states, the data buses D1 and D2 fall into non-connected states.

Although the bidirectional bus driver T/R1 has been explained, the bidirectional bus driver T/R2 is arranged similarly thereto. Each one of bidrectional bus drivers T/R3 and T/R4 shown in FIG. 2 which will be discribed later is arranged similarly thereto.

Figure 4:
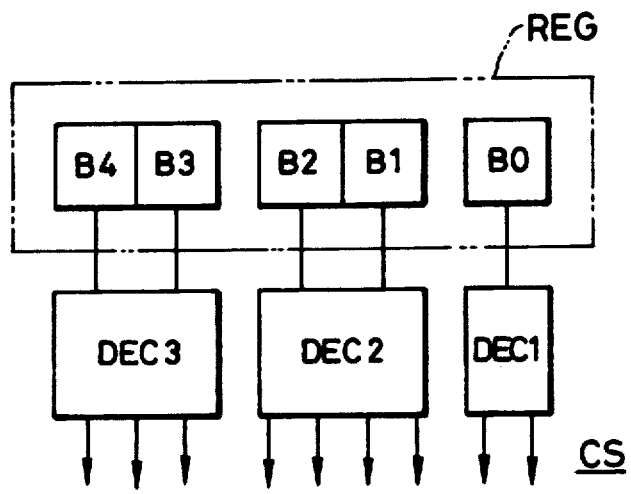
FIG. 4 is a diagram of the information bit format of a register which designates the operation mode of the direct memory access controller shown in FIGS. 1 and 2.

As shown in FIG. 4, the basic information bit format of the register REG is made up of an information bit B0 designating the kind of transfer, information bits B1 and B2 designating a transfer direction, and information bits B3 and B4 designating the kind of the bus layout of the system.

The information bit B0 designating the kind of transfer designates the data transfer between the memories MEM's with a logic value "0" by way of example, and the data transfer between the memory MEM and the input/output unit I/0 with a logic value "1." The information bits B2 and B1, designating a transfer direction, designate transfer from the common (local) side to the common (local) side when they have logic values "0" and "0". They designate transfer from the common (local) side to the system side when they have logic values "0" and "1". They designate transfer from the system side to the common (local) side when they have logic values "1" and "0". They designate transfer from the system side to the system side when they have logic values "1" and "1." With regard to the information bits B4 and B3 designating the kind of the bus layout, logic values "0" and "0" designate "not used" (or kept as a reserved code for future). Logic values "0" and "1" designate a single microcomputer system constructed of only a common (local) side. Logic values "1" and "0" designate the multi-microcomputer system constructed of the common and system sides as shown in FIG. 1. Logic values "1" and "1" designate a multi-microcomputer system constructed of local and system sides to be described later with reference to FIG. 2.

The information bits B0, B1 and B2, and B3 and B4 are respectively supplied to decoder circuits DEC1, DEC2, and DEC3 and used for forming the plurality of control signals CS having the significances stated above. The control signals C1, C2, etc. are formed on the basis of the plurality of control signals CS.

By way of example, in the multi-microcomputer system as shown in FIG. 1, the system microprocessor CPU1 accesses the register REG through the control bus SCB, beforehand with a method to be described later, so as to store the logic values "1" and "0" in the information bits B4 and B3 designating the bus layout. For example, in transferring data between the main memory MEM1 and the input/output unit I/O1 within the microcomputer system of the system side, the system microprocessor CPU1 accesses the built-in register REG of the direct memory access controller DMAC through the control bus SCB. An ordinary chip select signal shall be used for this access. When accessed from the system microprocessor CPU1, the direct memory access controller DMAC issues a bus request signal, not shown, to the common microprocessor CPU2 through the control bus CCB so as to release the buses of the common side. As a consequence, the common microcomputer system has its operation brought into a stop state. Thereafter, the direct memory access controller DMAC brings the bidirectional bus drivers T/R1 and T/R2 into the operating states and designates the signal transfer directions thereof, whereupon it is coupled to the data bus SDB and address bus SAB of the system side. The system microprocessor CPU1 accesses the register REG through the address bus SAB, data bus SDB and bidirectional bus drivers T/R1, T/R2 so as to set the bits B2 and B1 to the logic values "1" and "1" and the bit B0 to the logic value "1" without changing, the information of the bits B4 and B3. CPU1 also designates 1) the address of a transfer goal, 2) the number of data items to be transferred, and 3) the direction of the data transfer between the memory MEM1 and the unit I/O1 in a register, not shown, within the direct memory access controller DMAC, whereupon it brings the direct memory access controller DMAC into a start state. The start of the direct memory access controller DMAC is effected by writing a logic value "1" into a start bit in the register not shown. The direct memory access controller DMAC under the start state issues a bus request signal, not shown, to the system microprocessor CPU1 through the control bus SCB, and acquires the bus mastership of the system side. Thus, the direct memory access controller DMAC executes the data transfer operation between the input/output unit I/O1 and the main memory MEM1 as designated. Since such data transfer between the main memory unit MEM1 or MEM2 and the input/output unit I/O1 or I/O2 is similar to that of the prior-art direct memory access controller, the explanation of detailed operating timings shall be omitted. This holds true for data transfer operations to be described later. When the data transfer ends, the direct memory access controller DMAC delivers the bus mastership to the system microprocessor CPU1 and further applies an interrupt thereto to inform it of the end of the operation.

Meanwhile, a procedure for the data transfer between the main memory MEM2 and the input/output unit I/O2 on the common microcomputer system side is as stated below. Using a signal such as an interrupt, the common microprocessor CPU2 gives the system microprocessor CPU1 a message to the effect that it intends to transfer data. The message shall contain information indicating the data transfer between the main memory MEM2 and the input/output unit I/O2, the transfer address of the main memory MEM2, and the number of words to be transferred. As a method of conveying the message, a conventional method employing a shared memory shall be adopted. Upon receiving the message, the system microprocessor CPU1 accesses the direct memory access controller DMAC through the control bus SCB. When accessed from the system microprocessor CPU1, the direct memory access controller DMAC issues a bus request signal, not shown, to the common microprocessor CPU2 through the control bus CCB so as to release, the buses of the common side. Further, as stated above, it brings the bidirectional bus drivers T/R1 and T/R2 into the operating states to couple the buses SDB, SAB of the system side and the buses CDB, CAB of the common side. The system microprocessor CPU1 accesses the register REG through the address bus SAB and the data bus SDB so as to set the information bits B2 and B1 to the logic values "0" and "0" and the information bit B0 to the logic value "1" without changing the information of the bits B4 and B3. CPU 1 designates the address of a transfer goal, the number of data items to be transferred, and the direction of the data transfer between the memory MEM2 and the unit I/O2 in the register, not shown, within the direct memory access controller DMAC, whereupon it brings the direct memory access controller DMAC into the start state. The direct memory access controller DMAC under the start state immediately issues a bus request signal, not shown, to the system microprocessor CPU1 through the control bus SCB so as to bring this microprocessor into a stop state. Thereafter, when it decides the data transfer in the common microcomputer system on the basis of the logic values "0" and "0" of the bits B1 and B2, it brings the bidirectional bus drivers T/R1 and T/R2 into non-operating states, while it stops the generation of the bus request signal issued to the system microprocessor CPU1, thereby to bring this microprocessor into an operating state. Accordingly, the microcomputer of the system side can continue all information processing except data transfer operations which use the direct memory access controller DMAC. The direct memory access controller DMAC keeps the bus mastership of the common bus side, and executes the data transfer operation between the input/output unit I/O2 and the main memory unit MEM2 as designated. When the data transfer ends, the direct memory access controller DMAC applies an interrupt to the common microprocessor CPU2 and informs this microprocessor of the end of the data transfer operation.

In the case where data is to be transferred from the input/output unit I/O1 of the system side to the main memory MEM2 of the common side in accordance with the program of the system microprocessor CPU1, the system microprocessor CPU1 accesses the direct memory access controller DMAC through the control bus SCB. When accessed from the system microprocessor CPU1, the direct memory access controller DMAC issues a bus request signal, not shown, to the common microprocessor CPU2 through the control bus CCB so as to release the buses of the common side. As consequence, the common microcomputer system has its operation brought into the stop state as in the foregoing. The direct memory access controller DMAC brings the bidirectional bus drivers T/R1 and T/R2 into the operating states, and designates the signal transfer directions thereof. Thus, the data bus SDB and address bus SAB of the system side are respectively coupled with the data bus CDB and address bus CAB of the common side. The system microprocessor CPU1 accesses the register REG through the address bus SAB, data bus SDB and bidirectional bus drivers T/R1, T/R2 so as to set the information bits B2 and B1 to the logic values "1" and "0" and the information bit B0 to the logic value "1" without changing the information of the bits B4 and B3. CPU1 also designates the address of a transfer goal, and the number of data items to be transferred, in the register, not shown, within the direct memory access controller DMAC, whereupon it brings the direct memory access controller DMAC into the start state. The direct memory access controller DMAC under the start state issues a bus request signal, not shown, to the system microprocessor CPU1 through the control bus SCB, and acquires the bus mastership of the system side. After the direct memory access controller DMAC has acquired the bus masterships of the system bus and the common (local) bus as stated above, it sends address information to the main memory MEM2. The address information designates a data storing address in the main memory MEM2. This address information is supplied from the address terminal ADD to the main memory MEM2 through the address bus CAB. As a result, the data storing address of the main memory MEM2 is designated. Thereafter, a data transfer instruction is output from the direct memory access controller DMAC to the input/output unit I/O1. In addition, the bidirectional bus driver T/R1 is brought into the operating state by the control signal C1. Thus, output data from the input/output unit I/O1 is supplied to the main memory MEM2 through the data bus SDB, bidirectional bus driver T/R1 and data bus CDB. When the data transfer operation ends, the direct memory access controller DMAC applies interrupts to the microprocessors CPU1 and CPU2 and informs them of the end of the operation.

Further, in a case where data is to be transferred from the main memory MEM1 of the system side to the main memory MEM2 of the common side in accordance with the program of the system microprocessor CPU1, the system microprocessor CPU1 accesses the direct memory access controller DMAC through the control bus SCB. When accessed from the system microprocessor CPU1, the direct memory access controller DMAC issues a bus request signal, not shown, to the common microprocessor CPU2 through the control bus CCB so as to release the buses of the common side. In consequence, the common microcomputer system has its operation brought into the stop state as in the foregoing. The direct memory access controller DMAC brings the bidirectional bus drivers T/R1 and T/R2 into the operating states, and designates the signal transfer directions thereof. Thus, the data bus SDB and address bus SAB of the system side are respectively coupled with the data bus CDB and address bus CAB of the common side. The system microprocessor CPU1 accesses the register REG through the address bus SAB, data bus SDB and bidirectional bus drivers T/R1, T/R2 so as to set the information bits B2 and B1 to the logic values "1" and "0" and the information bit B0 to the logic value "0" without changing the information of the bits B4 and B3. CPU1 also designates the address of a transfer goal, and the number of data items to be transferred, in the register, not shown, within the direct memory access controller DMAC, whereupon it brings the direct memory access controller DMAC into the start state. The direct memory access controller DMAC under the start state issues a bus request signal, not shown, to the system microprocessor CPU1 through the control bus SCB, and acquires the bus mastership of the system side. As stated above, the direct memory access controller DMAC acquires the bus masterships of the system bus and the common (local) bus. Thereafter, the bidirectional bus driver T/R2 is brought into the operating state by the control signal C2. As a result, address information which designates a location storing the data to be transferred from the main memory MEM1 can be supplied to this main memory MEM1 through the address terminal ADD of the direct memory access controller DMAC, bidirectional bus driver T/R2 and address bus SAB. Subsequently, the bidirectional bus driver T/R1 is brought into the operating state on the basis of the control signal C1 produced from the direct memory access controller DMAC. The output data from the main memory MEM1 is gathered into the direct memory access controller DMAC through the data bus SDB, bidirectional bus driver T/R1 under the operating state and data terminal DAT of this direct memory access controller. When the data gathering ends, the direct memory access controller DMAC sends address information for designating the data storing address of the main memory MEM2, to this main memory MEM2 through the address terminal ADD and address bus CAB. After sending the address information, the direct memory access controller DMAC transfers the data having been gathered therein, to the main memory MEM2 through the data bus CDB. When the data transfer operation ends, the direct memory access controller DMAC supplies interrupts to the microprocessors CPU1 and CPU2 and informs them of the end of the operation.

As thus far described, in the case of transferring data from the input/output unit I/01 to the main memory MEM2, the data to be transferred is not gathered into the direct memory access controller DMAC. In contrast, in the case of transferring data from the main memory MEM1 to the main memory MEM2, the data to be transferred is gathered into the direct memory access controller DMAC, and it is thereafter transferred to the main memory MEM2 at a predetermined timing. The gathering of transfer data into the direct memory access controller DMAC, serves to adjust the timing for supplying the transfer data to the main memory MEM2. More specifically, unlike using the input/output unit I/01, using the memory MEM1 as the supply source of the transfer data requires address information which designates an address storing the data to-be-transferred. The address information is sent from the direct memory access controller DMAC to address information for the main memory MEM2. Since, in this case, both the address information items are output from the address terminal ADD in time sequence, the supply source (main memory MEM1) and supply goal (main memory MEM2) of the transfer data have different operating timings. Therefore, in the case of transferring the data from the main memory MEM1 to a main memory MEM2, the different path for the data transfer is set in order to adjust the supply timing of the address information and that of the transfer data for the main memory MEM2.

In this embodiment, the direct memory access controller DMAC is additionally furnished with the register REG as described above. The function of decoding the information bits of the register and forming the control signals of the external data transfer circuit including the bus drivers, whereby the data transfer between the microcomputer systems in the multi-microcomputer system as stated above, can be realized.

Figure 2:
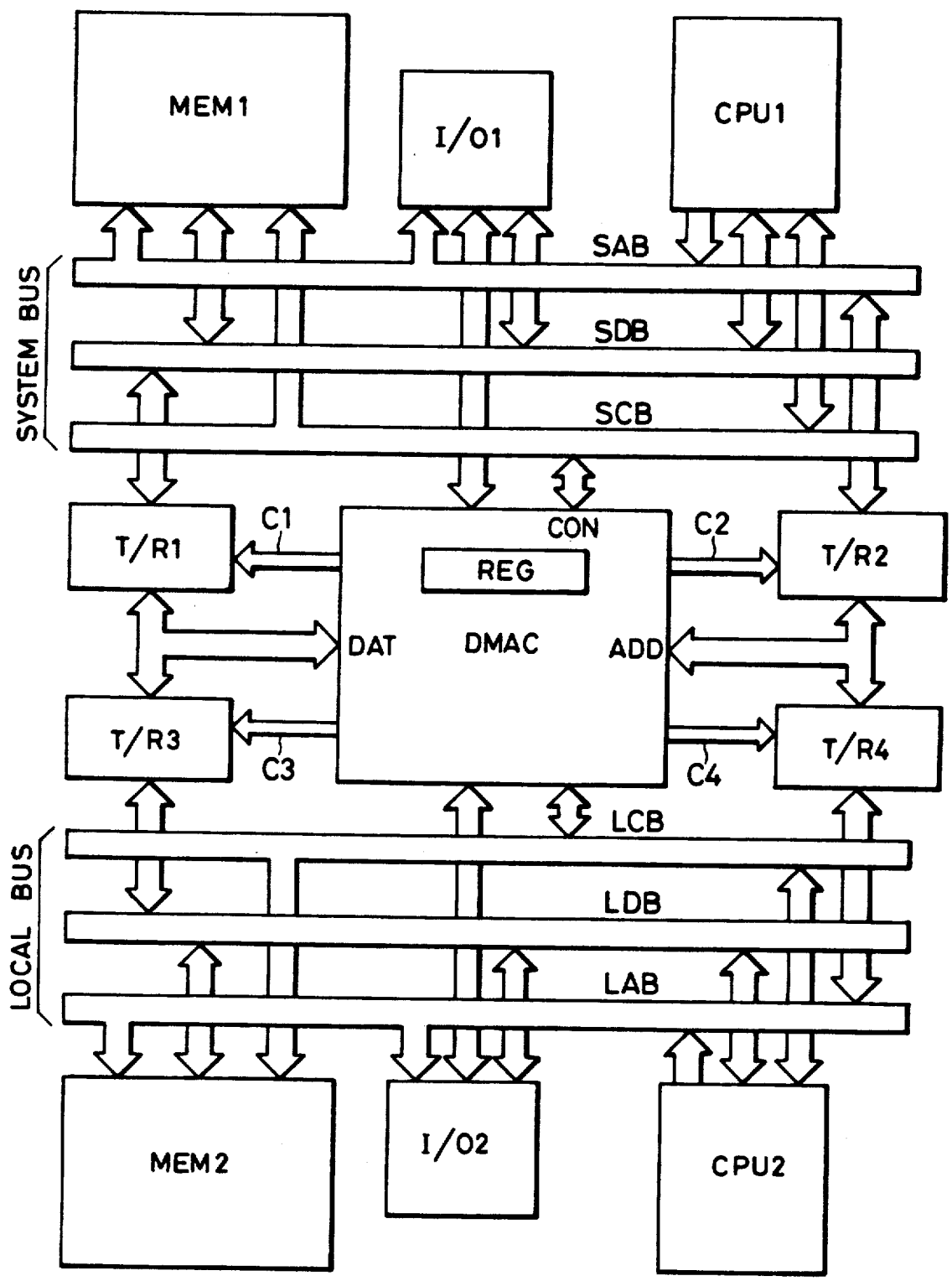
FIG. 2 is a block diagram showing another embodiment of a multi-microcomputer system which employs the direct memory access controller according to this invention.

Shown in FIG. 2 is a block diagram of another embodiment of the multi-microcomputer system which employs the direct memory access controller according to this invention. The multi-microcomputer system of this embodiment adopts a high-function 2-bus scheme wherein two microcomputer systems on a system side and a local side lie in a relationship of equality.

In this embodiment, the microcomputer on the system side is basically constructed of a system microprocessor CPU1, a main memory unit MEM1 and an input/output unit I/01 as in FIG. 1. These constituents are interconnected through an address bus SAB, a data bus SDB and a control bus SCB.

The microcomputer on the local side is basically constructed of a local microprocessor CPU2, a main memory unit MEM2 and an input/output unit I/02. These constituents are interconnected through an address bus LAB, a data bus LDB and a control bus LCB.

A direct memory access controller DMAC is furnished with the function of transferring data between the main memory unit MEM1 or MEM2 and input/output unit I/01 or I/02 of each of the microcomputer systems on the system side and the local side. The DMAC can also transfer data across the two systems.

In order to hold the two microcomputer systems in the equal relationship as described above, the data terminal DAT and address terminal ADD of the direct memory access controller DMAC are respectively coupled to the data bus SDB and address bus SAB of the system side and the data bus LDB and address bus LAB of the local side through bidirectional bus drivers T/R1, T/R2, T/R3 and T/R4.

The direct memory access controller DMAC has input/output terminals which are coupled with the input/output units I/01 and I/02 in both microcomputer, systems by control lines. The DMAC I/O terminals are also coupled to the control buses SCB and LCB.

Since the direct memory access controller DMAC of this embodiment has the bidirectional bus drivers T/R1, T/R2 and T/R3, T/R4 respectively disposed for the system side and the local side as stated above, control signals C1, C2 and C3, C4 corresponding thereto are formed. Incidentally, it is to be understood that, in case of applying the direct memory access controller DMAC of this embodiment to the multi-microcomputer system of the simplified 2-bus scheme as shown in FIG. 1, the signals C3 and C4 are not used.

Also in this embodiment, a bus layout and a transfer operation mode are designated by the register REG having the information bits B0 thru B4 as shown in FIG. 4.

By way of example, in the multi-microcomputer system as shown in FIG. 2, logic values "1" and "1" are stored in the information bits B4 and B3 which designate the bus layout. Thus, the control signals C3 and C4 to be supplied to the respective bidirectional bus drivers T/R3 and T/R4 disposed for the data bus LDB and address bus LAB of the local side are selectively output in accordance with the transfer modes to be described later. For example, in transferring data between the main memory MEM1 and the input/output unit I/01 within the microcomputer system of the system side, the system microcomputer CPU1 starts the direct memory access controller DMAC through the control bus SCB. When the direct memory access controller DMAC is brought into an operating state, it brings the bidirectional bus drivers T/R1 and T/R2 into operating states and designates the signal transfer directions thereof, whereupon it is coupled to the data bus SDB and address bus SAB of the system side. Meanwhile, the bidirectional bus drivers T/R3 and T/R4 of the local side are kept in non-operating states, so that the microcomputer system of the local side can continue all of its normal operation except any data transfer operation utilizing the direct memory access controller DMAC. Thus, during the data transfer between the input/ output unit I/01 and main memory MEM1 on the system side to be explained below, the microcomputer system of the local side continues its operation. Hence, the performance of the total system can be enhanced.

The system microprocessor CPU1 accesses the register REG through the address bus SAB, data bus SDB and bidirectional bidirectional bus drivers T/R1, T/R2 so as to set the information bits B2 and B1 to logic values "1" and "1" and the information bit B0 to a logic value "1". CPU1 also designates the address of a transfer goal, the number of data items to be transferred, etc., whereupon it starts the direct memory access controller DMAC. Judging from the information bits, the direct memory access controller DMAC acquires only the bus mastership of the system side and executes the data transfer operation between the input/output unit I/01 and the main memory unit MEM1 as designated. When the data transfer ends, the direct memory access controller DMAC supplies an interrupt to the system microprocessor CPU1 and informs it of the end of the operation.

Meanwhile, when data is to be transferred between the main memory MEM2 and the input/output unit I/02 on the side of the local microcomputer system, the local microprocessor CPU2 accesses the direct memory access controller DMAC through the control bus LCB. When accessed from the local microprocessor CPU2, the direct memory access controller DMAC brings the bidirectional bus drivers T/R3 and T/R4 into operating states and designates the signal transfer directions thereof, whereupon it is coupled to the data bus LDB and address bus LAB of the local side. Meanwhile, the bidirectional bus drivers T/R1 and T/R2 of the system side are kept in non-operating states, so that the microcomputer system of the system side can continue all of its normal operation except any data transfer operation utilizing the direct memory access controller DMAC. Thus, during the data transfer between the input/ output unit I/02 and main memory MEM2 on the local side to be explained below, the microcomputer system of the system side continues its operation.

The local microprocessor CPU2 accesses the register REG through the address bus LAB, data bus LDB and bidirectional bus drivers T/R3, T/R4 so as to set the information bits B2 and B1 to logic values "0" and "0" and the information bit B0 to a logic value "1". CPU2 also designates the address of a transfer goal, the number of data items to be transferred, etc., whereupon it brings the direct memory access controller DMAC into the start state. The direct memory access controller DMAC acquires only the bus mastership of the local side and executes the data transfer operation between the input/output unit I/02 and the main memory unit MEM2 as designated. When the data transfer ends, the direct memory access controller DMAC supplies an interrupt to the local microprocessor CPU2 and informs it of the end of the operation.

In addition, in the case where data is to be transferred from the input/output unit I/01 of the system side to the main memory MEM2 of the local side in accordance with the program of the system microprocessor CPU1, this system microprocessor CPU1 accesses the direct memory access controller DMAC through the control bus SCB. The direct memory access controller DMAC brings the bidirectional bus drivers T/R1 and T/R2 into the operating states, and designates the signal transfer directions thereof. The microprocessor CPU1 of the system side accesses the register REG through the data bus SDB, address bus SAB and bidirectional bus drivers T/R1, T/R2 so as to set the information bits B2 and B1 to logic values "1" and "0" and the information bit B0 to a logic value "1". CPU1 also designates the address of a transfer goal and the number of data items to be transferred, whereupon it starts the direct memory access controller DMAC. The direct memory access controller DMAC decides on the basis of the logic values "1" and "0" of the information bits B2 and B1 that the transfer source is the system side, and it applies a bus request signal, not shown, to the microprocessor CPU1 of the system side through the control bus SCB so as to release the system bus. Likewise, the direct memory access controller DMAC decides that the transfer goal is the local side, and it applies a bus request signal, not shown, to the microprocessor CPU2 of the local side through the control bus LCB so as to release the local bus. After the direct memory access controller DMAC has acquired the bus masterships of the system bus and the local bus as stated above, it brings the bidirectional bus driver T/R4 into the operating state by the use of the control signal C4. The direct memory access controller DMAC provides address information which is to be supplied to the main memory MEM2. This address information is supplied to the main memory MEM2 through the address terminal ADD, bidirectional bus driver T/R4 and address bus LAB. As a result, the location of the data to be transferred to the main memory MEM2 is designated. Thereafter, a data transfer instruction is output from the direct memory access controller DMAC to the input/ output unit I/01. Besides, the bidirectional bus drivers T/R1 and T/R3 are respectively controlled into the operating states by the control signals C1 and C3. Thus, the output data from the input/output unit I/01 is transferred to the main memory MEM2 through the data bus SDB, bidirectional bus drivers T/R and T/R3, and data bus LDB. When the data transfer operation ends, the direct memory access controller DMAC supplies interrupts to the microaccess processors CPU1 and CPU2 and informs them of the end of the operation.

Additionally, in the case where data is to be transferred from the main memory MEM1 of the system side to the main memory MEM2 of the local side in accordance with the program of the system microprocessor CPU1, this system microprocessor CPU1 accesses the direct memory access controller DMAC through the control bus SCB. The direct memory access controller DMAC brings the bidirectional bus drivers T/R1 and T/R2 into the operating states, and designates the signal transfer directions thereof. The microprocessor CPU1 of the system side accesses the register REG through the data bus SDB, address bus SAB and bidirectional bus drivers T/R1, T/R2 so as to set the information bits B2 and B1 to the logic values "1" and "0" and the information bit B0 to a logic value "0". CPU1 also designates the address of a transfer goal and the number of data items to be transferred, whereupon it starts the direct memory access controller DMAC. The direct memory access controller DMAC decides on the basis of the logic values "1" and "0" of the information bits B2 and B1 that the transfer source is the system side. Thereafter, the direct memory access controller DMAC transmits a bus request signal, not shown, to the microprocessor CPU1 of the system side through the control bus SCB. Upon receiving this bus request signal, the microprocessor CPU1 releases the system bus. The direct memory access controller DMAC decides that the transfer goal of the data is the local side. On the basis of this decision, it transmits a bus request signal, not shown, to the microprocessor CPU2 of the local side through the control bus LCB. Upon receiving this bus request signal, the microprocessor CPU2 releases the local bus. As stated above, the direct memory access controller DMAC acquires the bus masterships of the system bus and the local bus. Besides, the bidirectional bus driver T/R2 receives the control signal C2 and is brought into the operating state. Then, address information which designates a location storing the data to be transferred from the main memory MEM1 is supplied to this main memory MEM1 through the address terminal ADD, bidirectional bus driver T/R2 under the operating state and address bus SAB. Subsequently, the bidirectional bus driver T/R1 is brought into the operating state on the basis of the control signal C1 produced from the direct memory access controller DMAC. The output data from the main memory MEM1 is gathered into the direct memory access controller DMAC through the data bus SDB, bidirectional bus driver T/R1 under the operating state and data terminal DAT. When the data gathering ends, the bidirectional bus driver T/R4 is brought into the operating state on the basis of the control signal C4. As a result, address information for the main memory MEM2 is supplied to the main memory MEM2 through the address terminal ADD, bidirectional bus driver T/R4 under the operating state and address bus LAB. Thus, the address of the main memory MEM2 where the transfer data is to be stored is designated. Thereafter, the bidirectional bus driver T/R3 is brought into the operating state on the basis of the control signal C3. Thus, the data having been temporarily gathered in the direct memory access controller DMAC is transferred to the main memory MEM2 through the data terminal DAT, bidirectional bus driver T/R3 under the operating state and data bus LDB. When the data transfer operation ends, the direct memory access controller DMAC applies interrupts to the microprocessors CPU1 and CPU2 and informs them of the end of the operation.

Further, in a case where data is to be transferred from the input/output unit I/02 of the local side to the main memory unit MEM1 of the system side or from the main memory unit MEM2 of the local side to the main memory unit MEM1 of the system side in accordance with the program of the local microprocessor CPU2, the microprocessor CPU2 of the local side accesses the direct memory access controller DMAC through the control bus LCB. The direct memory access controller DMAC brings the bidirectional bus drivers T/R3 and T/R4 into the operating states and designates the signal transfer directions thereof, whereupon it is coupled to the data bus LDB and address bus LAB of the local side. The microprocessor CPU2 of the local side accesses the register REG through the data bus LDB, address bus LAB and bidirectional bus drivers T/R3, T/R4 so as to set the information bits B2 and B1 to logic values "0" and "1" and the information bit B0 to a logic value "1" (or "0"). CPU2 also designates the address of a transfer goal and the number of data items to be transferred, whereupon it starts the direct memory access controller DMAC. Upon deciding from the logic values "0" and "1" of the information bits B2 and B1 that a transfer source is the local side while the transfer goal is the system side, the direct memory access controller DMAC applies a bus request signal, not shown, to the microprocessor CPU1 of the system side through the control bus SCB so as to release the system bus. Likewise, the local bus is released. The direct memory access controller DMAC brings the bidirectional bus drivers T/R1, T/R2, TR3 and TR4, connected to the buses into the operating states, and designates the transfer directions thereof so as to execute the operation of data transfer from the input/output unit I/02 of the local side to the main memory unit MEM1 of the system side or from the main memory unit MEM2 of the local side to the main memory unit MEM1 of the system side. When the data transfer operation ends, the direct memory access controller DMAC supplies interrupts to the microprocessors CPU1 and CPU2 and informs them of the end of the operation.

In this embodiment, the direct memory access controller DMAC is additionally furnished with the register REG as described above and the function of decoding the information bits of the register and forming the control signals of the external data transfer circuit including the bus drivers, whereby the data transfer between the microcomputer systems in the multi-microcomputer system as stated above can be realized.

Figure 5:
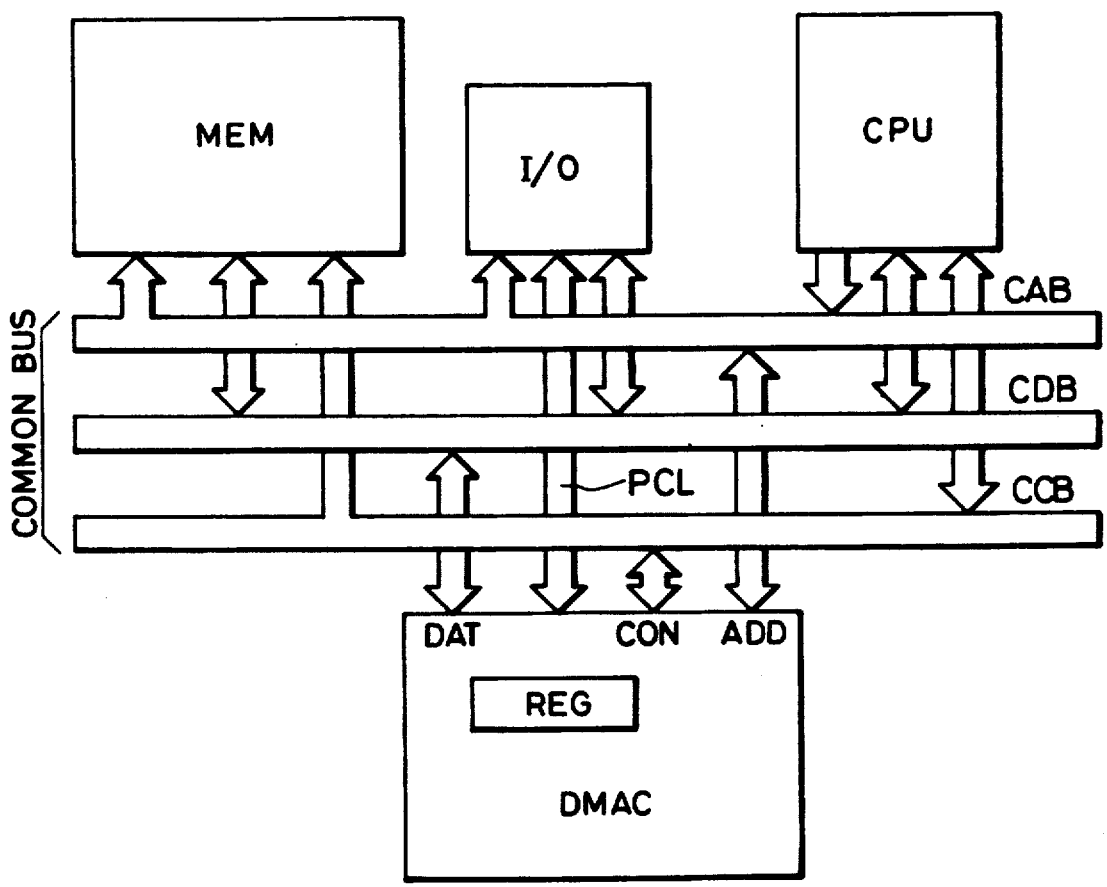
FIG. 5 is a block diagram showing an embodiment of a single microcomputer system which employs the direct memory access controller according to this invention.

Shown in FIG. 5 is a block diagram of an embodiment of a single microcomputer system which employs the direct memory access controller according to this invention. The microcomputer of this embodiment is basically constructed of a microprocessor CPU, a main memory unit MEM and an input/output unit I/0. These constituents are interconnected through common buses such as an address bus CAB, a data bus CDB and a control bus CCB.

In such a single microcomputer of this embodiment, the information bits B4 and B3 of the register REG built in the direct memory access controller DMAC are set to logic values "0" and "1." In this case, no bus driver is required between the common bus and the direct memory access controller DMAC. In general, however, the bus drivers are sometimes needed for such a reason that the direct memory access controller DMAC and the unit I/0 are packaged on separate boards. On that occasion, the signals C1 and C2 are employed as bus driver control signals. In the operation of data transfer, the microprocessor CPU designates only the information bit B0 indicative of the kind of the transfer as valid information. Thus, the direct memory access controller DMAC executes the data transfer operation between the main memory MEM and the input/output unit I/0 similarly to the data transfer between the main memory MEM2 and the input/output unit I/02 within the common microcomputer system in FIG. 1.

Functional effects which are attained by the foregoing embodiments are as follows:

(1) A direct memory access controller is additionally furnished with the function of forming control signals for data transfer between at least two buses in accordance with information bits which designate the bus layout and transfer mode of a system. This produces the effect that, when the direct memory access controller is used for a multi-microcomputer system, the data transfer between the buses conforming to the designated bus layout is realized merely by disposing bidirectional bus drivers which are controlled by the data transfer control signals formed in accordance with the designation of the bus layout and transfer mode.

(2) Control signals for two sets of bidirectional bus drivers are prepared as the data transfer control signals. This produces the effect that a direct memory access controller coping with the high-function 2-bus scheme can be provided, and that it can be directly applied also to the simplified 2-bus scheme and the single-bus scheme by altering the information bits thereof.

In the above, the invention made by the inventors has been concretely described in conjunction with embodiments. Needless to say, however, the present invention is not restricted to the foregoing embodiments, but that it can be variously modified within a scope not departing from the purpose thereof. By way of example, among the information bits designating the bus layout and the data transfer mode, those designating the bus layout may well be set by a ROM or by altering the wiring thereof. Further, an auxiliary function may well be given by adding information bits which designate the protocols or widths of the buses. The data transfer between two kinds of different systems can be realized by the designation of the information bits.

This invention can be extensively utilized for data transfer devices between a plurality of microcomputer systems.

What is claimed is:

1. A multi-microcomputer system comprising:
   a first microcomputer system, said first microcomputer system includes a first microprocessor, a first memory unit, a first address bus, and a first data bus;
   a second microcomputer system, said second microcomputer system includes a second microprocessor, a second memory unit, a second address bus, and a second data bus;
   coupling means for electrically coupling said first and second microcomputer systems wherein said first data bus and said second data bus are coupled through first coupling means and said first address bus and said second address bus are coupled through second coupling means wherein said first coupling means has a first data transmitting function of transmitting data on said first data bus to said second data bus, a second data transmitting function of transmitting data on said second data bus to said first data bus, and a data non-transmitting function of inhibiting transmission of the data between said first data bus and said second data bus, and wherein any one of said first data transmitting function, said second transmitting function and said data non-transmitting function is selectively validated by the first coupling means in response to control signals;
   a direct memory access controller;
   said direct memory access controller including means for controlling a data transfer operation which is executed between said first microcomputer system and said second microcomputer system;
   said direct memory access controller further including means for controlling a data transfer operation which is executed within said first microcomputer;
   said direct memory access controller further including means for controlling a data transfer operation which is executed within said second microcomputer system; and,
   said direct memory access controller further including means for generating the control signals to control the coupling means.

2. A multi-microcomputer system according to claim 1, wherein said second coupling means has a first address information transmitting function of transmitting address information on said first address bus to said second address bus, a second address information transmitting function of transmitting address information on said second address but to said first address bus, and an address information non-transmitting function of inhibiting transmission of the address information between said first address bus and said second address bus, and wherein any one of said first address information transmitting function, said second address information transmitting function and said address information non-transmitting function is selectively validated.

3. A microcomputer system according to claim 2, wherein:
   a data input terminal or data output terminal of said direct memory access controller is coupled to said first data bus through said first coupling means, and
   an address input terminal or address output terminal of said direct memory access controller is coupled to said first address bus through said second coupling means.

4. A multi-microcomputer system comprising:
   a first microcomputer system, said first microcomputer system includes a first microprocessor, a first memory unit, a first address bus, and a first data bus;
   a second microcomputer system, said second microcomputer system includes a second microprocessor, a second memory unit, a second address bus, and a second data bus;
   a direct memory access controller;
   coupling means comprising first, second, third and fourth coupling means for electrically coupling said first and second microcomputer systems wherein said first data bus and said second data bus are coupled through the first coupling means and said first address bus and said second address bus are coupled through the second coupling means, the third coupling means being arranged between said first coupling means and said second data bus, the fourth coupling means being arranged between said second coupling means and said second address bus and, said third coupling means and said fourth coupling means being controlled by said direct memory access controller;
   said direct memory access controller including means for controlling a data transfer operation which is executed between said first microcomputer system and said second microcomputer system;
   said direct memory access controller further including means for controlling a data transfer operation which is executed within said first microcomputer;
   said direct memory access controller further including means for controlling a data transfer operation which is executed within said second microcomputer system; and, said direct memory access controller further including means for generating control signals to control the coupling means.

5. A direct memory access controller comprising:

means for generating control signals for controlling coupling means coupled to a first microcomputer system and a second microcomputer system; and, a register for designating an operation mode of said direct memory access controller, the register comprising:

a control bit for designating an intersystmic data transfer operation which is executed between said first microcomputer system and said second microcomputer system, wherein said generating means generates said control signals in response to the designation of said control bit to operatively couple said first microcomputer system and said second microcomputer system via said coupling means; and, a control bit for designating an intrasystemic data transfer which is executed within at least one of said first microcomputer system and said second microcomputer system.

6. A direct memory access controller comprising:

a means for receiving control data from one of a plurality of processors;

a means for generating control signals based on the control data received wherein the control signals have a predetermined relationship to the control data;

means for transforming the control data into the control signals;

a means for transmitting the control signals to another processor of the plurality of processors;

a transferring means for transferring data from data storage means operatively connected via a first bus to one of the plurality of processors from which the control data was received, to a second data storage means operatively connected via a second bus to one of the plurality of processors to which the control signals were transmitted, the transferring means being operatively disposed between the first and second buses; and, a means for selectively controlling a coupling means whereby the transferring means is operatively connected via the first bus to the data storage means of one of the plurality of processors from which the control data was received and which connects the transferring means via the second bus to the data storage means of one of the plurality of processors to which the control signals were transmitted.

* * * * *